(12) United States Patent
    Weidenbacher

(10) Patent No.: US 9,255,435 B2
(45) Date of Patent: Feb. 9, 2016

(54) ACTUATING METHOD FOR ADJUSTING A VEHICLE WINDOW ADJUSTABLE BY AN ACTUATING MOTOR AND ACTUATING SYSTEM FOR SUCH A VEHICLE WINDOW

(71) Applicant: BROSE FAHRZEUGTEILE GMBH & CO. KOMMANDITGESELLSCHAFT, HALLSTADT, Hallstadt (DE)

(72) Inventor: Christian Weidenbacher, Donnersdorf (DE)

(73) Assignee: Brose Fahrzeugteile GmbH & Co. Kommanditgesellschaft, Hallstadt, Hallstadt (DE)

( * ) Notice: Subject to any disclaimer, the term of this patent is extended or adjusted under 35 U.S.C. 154(b) by 0 days.

(21) Appl. No.: 14/284,838

(22) Filed: May 22, 2014

(65) Prior Publication Data

US 2014/0373446 A1    Dec. 25, 2014

(30) Foreign Application Priority Data

May 23, 2013  (DE) .......................... 10 2013 008 747

(51) Int. Cl.

| | |
|---|---|
| *E05F 15/20* | (2006.01) |
| *E05F 15/695* | (2015.01) |
| *E05F 15/74* | (2015.01) |
| *E05F 15/689* | (2015.01) |
| *E05F 15/73* | (2015.01) |

(52) U.S. Cl.
    CPC .............. *E05F 15/20* (2013.01); *E05F 15/695* (2015.01); *E05F 15/74* (2015.01); *E05F 15/689* (2015.01); *E05F 2015/765* (2015.01); *E05F 2015/767* (2015.01)

(58) Field of Classification Search
    CPC ..... E05F 15/20; E05F 15/203; E05F 15/1684; E05F 15/1669; E05F 2015/2061; E05F 2015/2069
    USPC .......... 49/25, 28, 31, 506; 340/438, 439, 522, 340/457.1, 573.4
    See application file for complete search history.

(56) References Cited

U.S. PATENT DOCUMENTS

| | | | |
|---|---|---|---|
| 5,238,447 A | 8/1993 | Weissbrich et al. | |
| 5,326,967 A * | 7/1994 | Herrmann et al. | ............ 250/221 |
| 5,506,567 A * | 4/1996 | Bichlmaier et al. | .......... 340/555 |
| 6,693,273 B1 * | 2/2004 | O'Connor et al. | ............ 250/221 |

(Continued)

FOREIGN PATENT DOCUMENTS

| | | |
|---|---|---|
| DE | 4130360 C1 | 4/1993 |
| DE | 102005037471 A1 | 2/2007 |

(Continued)

*Primary Examiner* — Jerry Redman
(74) *Attorney, Agent, or Firm* — Laurence A. Greenberg; Werner H. Stemer; Ralph E. Locher

(57) ABSTRACT

A servo system and an actuating method for adjusting a vehicle window that can be adjusted with a servomotor. For the sake of improved driving comfort, to permit adjustment of the vehicle window with a sensor, a measurement volume which adjoins the vehicle window in the passenger compartment of a vehicle is monitored for the presence of a body part of a vehicle occupant and/or the presence of a lighted cigarette. The vehicle window is lowered here from its closed position by a portion of its actuating path if the presence of a body part or the presence of a burning cigarette is detected in the measurement volume.

10 Claims, 1 Drawing Sheet

(56) References Cited

U.S. PATENT DOCUMENTS

| | | | |
|---|---|---|---|
| 6,925,755 B1 * | 8/2005 | Kyrtsos | 49/26 |
| 7,175,227 B2 * | 2/2007 | Menard | 296/146.4 |
| 8,044,782 B2 * | 10/2011 | Saban | 340/438 |
| 8,143,832 B2 * | 3/2012 | Holzmann et al. | 318/466 |
| 8,219,288 B2 | 7/2012 | Schulter et al. | |
| 8,615,927 B2 * | 12/2013 | Ezzat et al. | 49/26 |
| 2002/0157313 A1 * | 10/2002 | Fukazawa et al. | 49/26 |
| 2003/0209893 A1 * | 11/2003 | Breed et al. | 280/735 |
| 2010/0228446 A1 * | 9/2010 | Schulter et al. | 701/49 |
| 2013/0067816 A1 * | 3/2013 | Chang et al. | 49/25 |
| 2013/0305608 A1 * | 11/2013 | Ersek et al. | 49/13 |
| 2013/0340341 A1 * | 12/2013 | Shibata | 49/25 |
| 2014/0005895 A1 | 1/2014 | Entenmann et al. | |
| 2014/0173984 A1 * | 6/2014 | Schlesiger et al. | 49/28 |

FOREIGN PATENT DOCUMENTS

| | | |
|---|---|---|
| DE | 102005054171 A1 | 5/2007 |
| KR | 20010093867 A | 10/2001 |
| WO | 2007054363 A2 | 5/2007 |
| WO | 2012126586 A1 | 9/2012 |

* cited by examiner

ACTUATING METHOD FOR ADJUSTING A VEHICLE WINDOW ADJUSTABLE BY AN ACTUATING MOTOR AND ACTUATING SYSTEM FOR SUCH A VEHICLE WINDOW

BACKGROUND OF THE INVENTION

Field of the Invention

The invention relates to an actuating method for adjusting a vehicle window which can be adjusted by means of a servomotor and to a servo system for such a vehicle window.

Owing to the strong smells which are generated when tobacco goods are used, smoking vehicle occupants frequently open a side window of the vehicle in order to allow fresh air to enter the passenger compartment of the vehicle.

However, when the weather is unfavorable, opening the window changes the internal temperature of the vehicle to an undesired extent. In addition, at a high travel speed the air in the passenger compartment of the vehicle can be heavily swirled as a result of incoming airflow. These circumstances contribute to an, at least subjectively experienced, reduction in the driving comfort in the passenger compartment of the vehicle.

BRIEF SUMMARY OF THE INVENTION

The invention is based on the object of increasing the driving comfort in a motor vehicle.

With respect to an actuating method, this object is achieved according to the invention as claimed. With respect to a servo system, the object is achieved according to the invention as claimed. Advantageous embodiments and developments of the invention, which are partially inventive per se, are presented in the dependent claims and the following description.

According to the invention, in order to adjust a vehicle window which can be adjusted by means of a servomotor, a measurement volume which adjoins the vehicle window in the passenger compartment of the vehicle is monitored, by means of a sensor, for the presence of a body part of a vehicle occupant and/or the presence of a burning cigarette. The vehicle window is lowered here from its closed position by a portion of the entire actuating path of the vehicle window if the presence of a body part or the presence of a burning cigarette is detected in the measurement volume. The term "cigarette" is used here and below in a general fashion for any tobacco goods and therefore also comprises, in particular, a cigar, a cigarillo or a filled pipe.

The vehicle window is lowered, i.e. opened, here in particular by a small portion of its entire actuating path. For example, the travel of the vehicle window, that is to say the actuating path travelled along, is approximately 2 to 5 cm, so that it is ensured the smoke will be effectively drawn out.

Detecting the approaching of the hand and/or of the burning cigarette and the subsequent partial lowering of the vehicle window makes it particularly easily possible for the passenger compartment of the vehicle to remain closed off from the surroundings of the vehicle until the vehicle occupant has the intention of holding the cigarette or the cigar in the vicinity of the open window or entirely out of the window in order to avoid smells. This is advantageous, in particular, in the case of cold external air, in order to influence the climate (interior climate) present in the passenger compartment of the vehicle as little as possible. In the case of high external temperatures, this permits the interior climate to be kept cool. Owing to the method according to the invention, the vehicle occupant, in particular the driver, does not need to actively open the vehicle window in order to tip ash from the cigarette or cigar. As a result, the associated distraction potential for the driver and the corresponding risk of an accident during driving are eliminated.

The vehicle window is preferably moved back into its closed position (closed) if the sensor detects that the hand and/or the cigarette is moved away from the vehicle window.

In order to prevent unintentional erroneous lowering of the vehicle window, the vehicle window is expediently not lowered until a predefined additional criterion is satisfied during the detection of the body part or the burning cigarette.

In a simple method variant, a time window of predefined duration is used as an additional criterion. This time window is opened, in particular, by the activation of a switch and results in the vehicle window being lowered only when the presence of a body part or a burning cigarette is detected within the time window. In contrast, approaching of the hand, which is detected or takes place outside of the time window, is not taken into account and therefore does not trigger any lowering of the vehicle window. This method variant is implemented, for example, with the effect that the sensor is activated for the duration of the time window by the activation of the switch, and after the expiry of the time window returns to an inactive state. The duration of the time window is preferably adapted here to the typical glowing period of a cigarette or a cigar and is, for example, 5-20 minutes. Optionally, it is possible for provision to be made within the scope of the invention so that the duration of the time window can be adjusted individually by a vehicle user.

The switch which opens the time window can be a manually activatable operator pushbutton. However, the switch is preferably integrated in the cigarette lighter of the vehicle so that the vehicle user does not have to actively and consciously trigger the time window. For example, in this case, a signal for opening the time window is output when the heated cigarette lighter is removed from its storage bushing.

Alternatively or additionally, the detection of smoke, in particular tobacco smoke, by means of a smoke detector is used as an additional criterion. In other words, the detection of the approaching of the hand is taken into account here for the triggering of the window opening only when smoking is actually taking place in the passenger compartment of the vehicle and therefore air inside the space is enriched with smoke. In this context, in particular an air quality sensor in a vehicle ventilation system or vehicle air conditioning system can be used as a smoke detector. As a result, a particularly high level of driving comfort is achieved since, on the one hand, intentional activation of the automatic window opening (i.e. triggered by active activation of a switch) is dispensed with and, on the other hand, erroneous lowering of the vehicle window is largely avoided.

In one expedient embodiment of the method, a temperature measured variable is detected by means of the sensor and is used to detect the hand and/or the burning cigarette. The presence of the hand or the burning cigarette in the measurement volume is detected here in the fact that the temperature measured variable exceeds a predefined temperature threshold. This temperature threshold is selected, in particular, in such a way that the customary body temperature is significantly exceeded, but on the other hand is below the glowing temperature of tobacco. For example, the temperature threshold is fixed at approximately 200° C. This easily permits the vehicle window to be opened only if the hand which is approaching the vehicle window is actually holding a glowing cigarette.

In order to detect the temperature measured variable, an infrared sensor (IR sensor or an infrared camera which serves as the sensor) or some other pyrometer, whose temperature measurement range is preferably between 20° C. and 1200° C., can be used, for example, as a sensor within the scope of the invention.

Alternatively or additionally, a sensor is used which detects the body part of the vehicle occupant, in particular the hand, as such—and therefore also without a cigarette. The sensor is embodied here, in particular, as a capacitive or optical sensor. In one advantageous embodiment, a measured variable which is characteristic of the distance and/or the movement of the body part from the sensor is detected by means of this sensor. This measured variable is evaluated as an additional criterion with respect to a movement pattern of the body part. When the predefined movement pattern is detected—and only then— the window is lowered here. For example, a stroking movement on the upper edge of the vehicle window can be provided as a movement pattern to be detected.

Through the detection of the movement pattern, the window opening can advantageously be intentionally triggered by a specific movement (gesture) with the hand holding the cigarette, as a result of which the likelihood of erroneous lowering of the vehicle window is reduced.

In order to be able to detect easily a stroking movement on the upper edge of the vehicle window when a capacitive measurement principle is used, the relevant sensor preferably comprises a plurality of electrode faces which are arranged one next to the other and which each form a separate capacitor with the vehicle bodywork which is connected to ground. The movement pattern is detected here, for example, via evaluation of time of the capacitance which is detected by means of each electrode face.

The servo system according to the invention comprises the sensor—designed, as described above, to monitor the measurement volume for the presence of a body part of a vehicle occupant and/or the presence of a burning cigarette—as well as a control unit. The control unit is configured here in terms of control or programming technology to carry out the actuating method as described above—preferably automatically. The control unit is therefore configured, in particular, to evaluate the signal of the sensor and to lower the vehicle window from its closed position by a portion of the entire actuating path of the vehicle window when it detects, on the basis of the sensor signal, the presence of a body part or the presence of a burning cigarette in the measurement volume.

The control unit can be embodied within the scope of the invention as a nonprogrammable electronic circuit and in this context be integrated, for example, into a controller of the servo motor which drives the vehicle window. However, the control unit is preferably formed by a microcontroller in which the functionality for carrying out the actuating method according to the invention is implemented in the form of a software model. This software module can form here, in particular, a component of a general control software (firmware) for the controller of the servomotor.

In one advantageous embodiment, the servo system comprises a switch which is coupled by circuit technology to the control unit in order to activate the automatic window opening for the predefined time window.

Alternatively or additionally, the servo system comprises a smoke detector which is connected by circuit technology to the control unit in order to activate the automatic window opening.

Exemplary embodiments of the invention are explained in more detail below with reference to a drawing, in which:

BRIEF DESCRIPTION OF THE SEVERAL VIEWS OF THE DRAWING

Parts which correspond to one another are always provided with the same reference symbols in all the figures.

DESCRIPTION OF THE INVENTION

Figure 1:
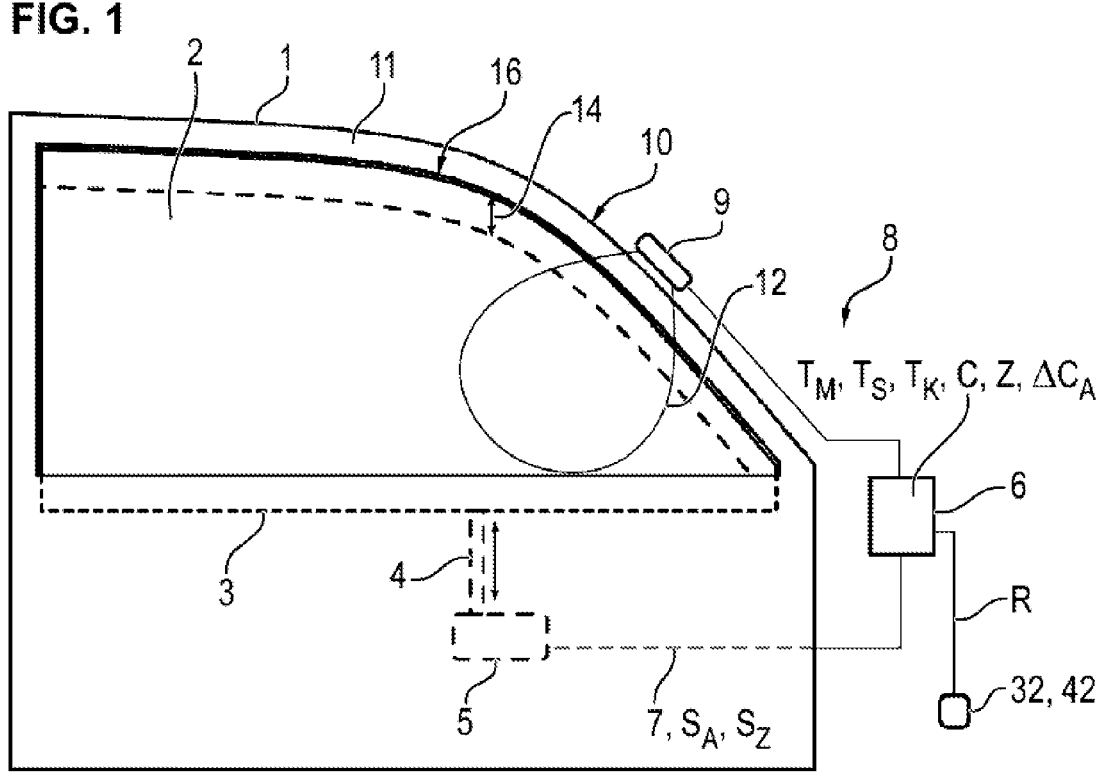
FIG. 1 shows a schematic illustration of a side door of a vehicle with a vehicle window which can be lowered therein, and with a servo system for controlling the adjustment of the side window.

FIG. 1 is a schematic illustration of a side door 1 of a vehicle when considered from the passenger compartment of the vehicle. A window 2, which can be reversibly opened and closed by means of a (vehicle) window 3 is inserted into the side door 1. The window 3 is connected to a servomotor 5 via a servo mechanism 4 in order to open and close the window 2.

The servomotor 5 is actuated by a control unit 6 which outputs actuating signals to the servomotor 5 via a control line 7. The control unit 6 is a component of a superordinate servo system 8. The servo system 8 comprises not only the control unit 6 but also a sensor 9 which is connected thereto by means of signal transmission technology. The sensor 9 is integrated into the region of the roof lining of the passenger compartment of the vehicle on the fixed vehicle frame or alternatively in the region of an upper edge 10 of the door frame 11 in the side door 1. The sensor 9 is oriented here in such a way that the measurement volume 12 which is detected in terms of measuring technology by the sensor 9 adjoins the inside of the window 3 and extends in the direction of the passenger compartment of the vehicle.

The measurement volume 12 forms here a window with a thickness of several centimeters, for example 10 to 20 cm extending approximately parallel to the window 3. Events outside of the measurement volume 12 are not detected by the sensor 9.

The control unit 6 is configured and provided in terms of circuit technology or programming technology to detect, by means of the sensor 9, a hand of a vehicle occupant holding a cigarette if the hand approaches the window 3 and in the process is moved into the measurement volume 12, and in this case to lower the window 3 by a predefined portion of the entire actuating path (referred to below for short as smoker gap 14) from a closed position 16. The closed position 16 refers here to that position of the window 3 in which the window 3 bears tightly against the door frame 11. The smoker gap 14 preferably takes up only a small fraction of the entire actuating path of the window 3 here.

Furthermore, the control unit 6 is configured to raise the window 3 again by the smoker gap 14 into the closed position 16 when it detects that the hand is removed from the measurement volume 12, i.e. from the window 3. The smoker gap 14 is dimensioned (for example with 3-5 cm clear width between the upper edge of the window 3 and the upper window seal) in such a way that it is ensured that smoke is effectively drawn out.

The sensor 9 is, in particular, an infrared camera. The control unit 6 is configured here to determine a temperature measured variable (referred to below as temperature measured value $T_M$) by means of the infrared camera, and to detect the approaching of the vehicle occupant's hand into the measurement volume 12 on the basis of this temperature measured value $T_M$. The temperature measured value $T_M$ represents here, in particular, the maximum value (or an average value) of the temperature in the measurement volume 12.

Figure 2:
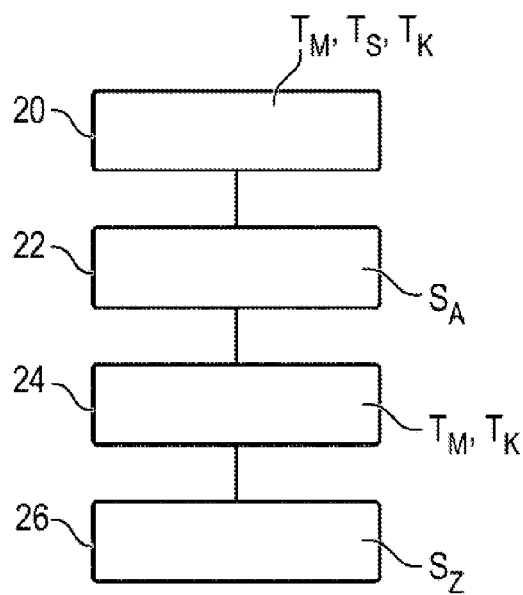
FIG. 2 shows a schematic flow chart of the actuating method which is carried out by the servo system.

In specific terms, in a first method step 20, the control unit 6 according to FIG. 2 checks, when the window 3 is closed, whether the detected temperature measured value $T_M$ exceeds a temperature threshold $T_S$ which is characteristic of the presence of a glowing cigarette (or cigar) within the measurement volume 12. The temperature threshold $T_S$ is, for example, 200° C. and is here significantly above the body surface temperature (approximately 32° C.) or else significantly below the temperature of glowing cigarette tobacco (approximately 800° C.-1100° C.). If the sensor 9 does not detect the maximum temperature but instead an average temperature in the measurement volume 12, the temperature threshold $T_S$ is given a correspondingly lower setting, with the result that the temperature threshold $T_S$ is triggered only by a hand holding a burning cigarette but not by the actual hand per se (without a burning cigarette).

If the temperature measured variable $T_M$ exceeds the temperature threshold $T_S$, the control unit 6 outputs, in a second method step 22, a gap opening signal $S_A$ to the servomotor 5. The servomotor 5 is activated on the basis of the opening signal $S_A$ and lowers the window 3 by the smoker gap 14.

In a third method step 24, the control unit 6 checks, on the basis of the temperature measured variable $T_M$, whether the vehicle occupant's hand is still located in the region of the measurement volume 12. In this context, the control unit 6 checks specifically whether the temperature measured variable $T_M$ exceeds a second temperature threshold $T_K$ which is adapted to the surface temperature of the hand and is, for example, 30° C. This prevents the control unit 6 from closing the window 3 if the glowing tip of the cigarette is held through the smoker gap 14 outside the vehicle and therefore outside the measurement volume 12. The second temperature threshold $T_K$ is also given a correspondingly lower selection if the sensor does not detect the maximum temperature but instead an average temperature in the measurement volume 12.

As long as the presence of the hand in the measurement volume 12 is detected by the sensor 9, the window 3 is left in the lowered position by the control unit 6. On the other hand, as soon as the hand is no longer detected by the sensor 9, the control unit 6 outputs, in a fourth method step 26, a closing signal $S_Z$ to the servomotor 5 on the basis of which the window 3 is raised by the smoker gap 14 and moved again into the closed position 16.

In an alternative embodiment, the sensor 9 is a capacitive proximity sensor. The capacitive proximity sensor is formed in one expedient embodiment by an electrode pair which forms an (electric) capacitor with a capacitance C. Alternatively, the sensor 9 can comprise an electrode which forms a capacitor with the vehicle bodywork which is connected to ground. The measurement volume 12 is formed by an alternating electrical field (i.e. an electrical field in which the field strength periodically changes sign) which is irradiated by the capacitive proximity sensor. The vehicle occupant's hand which is introduced into the measurement volume 12 changes here, by means of interaction with the alternating electrical field, the capacitance C which can be detected via the capacitive proximity sensor. As a result, by means of the capacitive proximity sensor 9, it is easily possible to detect the approaching of the hand to the window 3 within the measurement volume 12. In order to prevent the window 3 from being lowered when smoking is not occurring in the vehicle, the control unit 6 according to FIG. 3 checks, in a method step 30, whether a further criterion is satisfied. This criterion is a time window Z which is opened by means of a switching contact 32 which is connected to the control unit 6 by means of circuit technology. The switching contact 32 is, for example, integrated into the cigarette lighter of the vehicle in such a way that when the heated cigarette lighter is removed, in order to extinguish the cigarette a signal is output to the control unit 6, by means of which signal the time window Z is opened. The time window Z has a duration which corresponds to the typical glowing period of a cigarette or cigar. For example, the duration of the time window Z is 5 up to 20 minutes.

As long as the time window Z is opened, the control unit 6 checks, in a further method step 34, whether the capacitance C changes by a triggering threshold $\Delta C_A$. The triggering threshold $\Delta C_A$ is dimensioned in such a way that the opening of the window 3 is triggered only when the vehicle occupant's hand is within the measurement volume 12. After the expiry of the time window Z, the approaching of the hand to the window 3 is no longer taken into account by the control unit 6. The window 3 is therefore not opened if the hand is made to approach the window 3 after the expiry of the time window Z.

If the capacitance C within the time window Z exceeds the triggering threshold $\Delta C_A$, in a method step 36, the opening signal $S_A$ is output to the servomotor 5. "Exceeding of the threshold value" is to be understood here and below always in a direction-independent fashion to the effect that the difference of the capacitance measured variable (or the change thereof over time) and of the threshold value changes sign. Depending on the definition of the capacitance measured variable, the exceeding of the respective threshold value can be positive (in the sense of genuine exceeding, during which the capacitance measured variable becomes larger than the threshold value) or negative (in the sense of undershooting, during which the capacitance measured variable becomes smaller than the threshold value).

In a further method step 38, the control unit 6 checks whether the capacitance C continues to exceed the triggering threshold value $\Delta C_A$, i.e. whether the vehicle occupant is still holding the cigarette out of the window 2. In the event of the capacitance C no longer exceeding the triggering threshold value $\Delta C_A$ and returning, for example, to its initial value, the control unit 6 concludes that the vehicle occupant has removed his hand from the window 3. In this case, in a method step 40, the control unit 6 outputs the closing signal $S_Z$ to the servomotor 5 so that the window 3 is moved back into the closed position 16 again.

In an alternative exemplary embodiment (not illustrated in more detail), the control unit 6 is configured to determine, within the scope of the method step 34, that there is a predefined movement pattern of the hand within the measurement volume 12 on the basis of the capacitance C determined by means of the capacitive proximity sensor. If this movement pattern is detected by the control unit 6, the actuating method is carried out in accordance with the method steps 36, 38 and 40.

Figure 3:
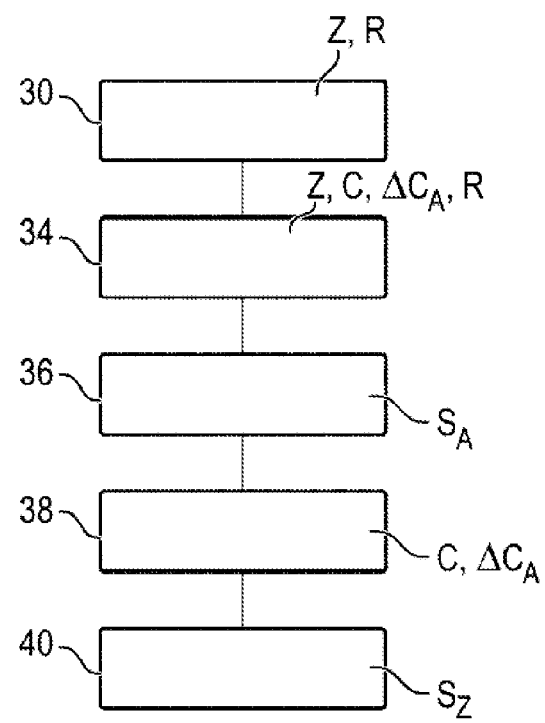
FIG. 3 shows an illustration according to FIG. 2 of a further exemplary embodiment of the actuating method.

In a further exemplary embodiment of the actuator 8, a smoke detector 42 is provided instead of the switch contact 32. Said smoke detector 42 is configured to output a smoke signal R to the control unit 6, as long as smoke is detected inside the passenger compartment of the vehicle. In the actuating method described on the basis of FIG. 3, the presence of the smoke signal R is used, instead of the time window Z, as an additional criterion in order to check for the exceeding of the triggering threshold value $\Delta C_A$ in the method step 34. The method steps 36, 38 and 40 of the method according to FIG. 3 are carried out correspondingly.

The subject matter of the invention is not limited to the exemplary embodiments described above. Instead, further embodiments of the invention can be derived from the above description by the person skilled in the art. In particular, the individual features of the invention which are described on the basis of the various exemplary embodiments, and the embodiment variants thereof, can also be combined with one another in another way. For example, in a further variant of the method and of the associated servo system 8, an infrared sensor and a capacitive proximity sensor are combined in the sensor 9. The window 3 is lowered here only when both the presence of the hand is detected by means of the capacitive proximity sensor, and the burning cigarette is detected by means of the infrared sensor, in the measurement volume.

| List of reference symbols | |
|---|---|
| 1 | Side door |
| 2 | Window |
| 3 | (Vehicle) window |
| 4 | Servo mechanism |
| 5 | Servomotor |
| 6 | Control unit |
| 7 | Control line |
| 8 | Servo system |
| 9 | Sensor |
| 10 | Upper edge |
| 11 | Door frame |
| 12 | Measurement volume |
| 14 | Smoker gap |
| 16 | Closed position |
| 20 | Method step |
| 22 | Method step |
| 24 | Method step |
| 26 | Method step |
| 30 | Method step |
| 32 | Switch |
| 34 | Method step |
| 36 | Method step |
| 38 | Method step |
| 40 | Method step |
| 42 | Smoke detector |
| $T_M$ | Temperature measured value |
| $T_K$ | Body temperature |
| $T_S$ | Temperature threshold |
| $S_A$ | Opening signal |
| $S_Z$ | Closing signal |
| Z | Time window |
| C | Capacitance |
| $\Delta C_A$ | Triggering threshold |
| R | Smoke signal |

The invention claimed is:

1. In a vehicle having a vehicle window that is adjusted by an actuating motor between a closed position, a fully open position, and partially open positions therebetween, an actuating method for adjusting the vehicle window, the method comprising:
   providing a sensor inside a passenger compartment of the vehicle and in vicinity of the vehicle window;
   monitoring a measurement volume which adjoins the vehicle window and the sensor in the passenger compartment of the vehicle with the sensor, for a presence of a body part of a vehicle occupant or for a presence of a lighted cigarette; and
   when the presence of the body part or the presence of the lighted cigarette is detected by the sensor in the measurement volume, causing the actuating motor to move the vehicle window from the closed position to a partly open position by moving the window from the closed position to the partly open position.

2. The actuating method according to claim 1, which comprises lowering the vehicle window only if a predefined additional criterion is satisfied when the body part or the lighted cigarette is detected.

3. The actuating method according to claim 2, wherein the additional criterion is that the presence of the body part or the lighted cigarette is detected within a predefined time window opened by an activation of a switch.

4. The actuating method according to claim 2, wherein the additional criterion is that smoke is detected by a smoke detector.

5. The actuating method according to claim 1, which comprises detecting a measured temperature variable with a sensor, detecting the presence of the body part or the presence of the lighted cigarette in the measurement volume if the detected measured temperature variable exceeds a predefined temperature threshold.

6. The actuating method according to claim 1, which comprises evaluating a measured variable detected by the sensor with respect to a movement pattern of the body part, and wherein the additional criterion is that a predefined movement pattern is detected on the basis of the measured variable.

7. In combination with a vehicle having a vehicle window that is adjusted by an actuating motor between a closed position, a fully open position, and partially open positions therebetween, a positioning system for the vehicle window, the positioning system comprising:
   a sensor attached to the vehicle inside a passenger compartment in vicinity of the vehicle window of the vehicle and disposed to monitor whether or not a body part of a vehicle occupant or a lighted cigarette is present in a measurement volume that adjoins the vehicle window and said sensor; and
   a control unit connected to said sensor and to the actuating motor which adjusts the vehicle window, said control unit:
   monitoring the measurement volume adjoining the vehicle window with said sensor which detects a presence of the body part of the vehicle occupant or for the presence of the lighted cigarette; and
   when the presence of the body part or the presence of the lighted cigarette is detected in the measurement volume, causing the actuating motor to lower the vehicle window from the closed position to a partly open position between the closed position and the fully open position.

8. The positioning system according to claim 7, further comprising a switch connected by circuitry to said control unit, for activating said sensor during a predefined time window.

9. The positioning system according to claim 7, further comprising a smoke detector for detecting smoke connected by circuitry to said control unit, in order to activate said sensor.

10. The positioning system according to claim 7, wherein said sensor is at least one sensor selected from the group consisting of a capacitive proximity sensor, an optical movement sensor and an infrared sensor.

* * * * *